March 15, 1960  C. H. STOCKDALE  2,928,497
AIRCRAFT ENGINE APPARATUS
Filed April 29, 1958

INVENTOR
CHARLES H. STOCKDALE
BY

United States Patent Office 2,928,497
Patented Mar. 15, 1960

2,928,497

AIRCRAFT ENGINE APPARATUS

Charles H. Stockdale, Mission, Kans., assignor to Westinghouse Electric Corporation, East Pittsburgh, Pa., a corporation of Pennsylvania Application April 29, 1958, Serial No. 731,791

8 Claims. (Cl. 183—62)

This invention relates to screens for the air intakes of aircraft engines, more particularly to retractable screens for the air intakes of aviation gas turbine engines, and has for an object to provide improved structures of this type.

Another object is to provide a screen which is retractable to a position completely out of the air stream and imposes no drag when in the stand-by condition.

A further object is to provide a screen structure having a debris receptacle for collecting debris intercepted by the screen.

In accordance with the invention, there is provided tubular outer and inner shell structure defining an annular air intake opening for an aviation gas turbine engine. The inner shell structure has a forwardly directed open end and an annular foraminous member or screen made of any suitable deformable material, such as wire mesh, is pivotally supported adjacent the open end. The scren is extensible in radially outward direction to a first position across the air intake opening, to intercept debris entrained in the air stream, and is retractable in radially inwardly direction out of the air intake opening to a second or "stand-by" position within the inner shell structure, when desired. A debris receptacle disposed within the inner shell structure is operatively connected to the screen with its opening in registry with the central opening in the screen. When the screen is in the first position it assumes a frustoconical shape. Thus any debris intercepted by the scren is funneled in radially inwardly direction, passes through the central opening therein to the debris receptacle, and is captured thereby.

A suitably faired closure member is further provided for closing the open end of the inner shell structure when the screen is in the retracted position.

The foregoing and other objects are effected by the invention as will be apparent from the following description and claims taken in connection with the accompanying drawings, forming a part of this application, in which:

Figure 1:
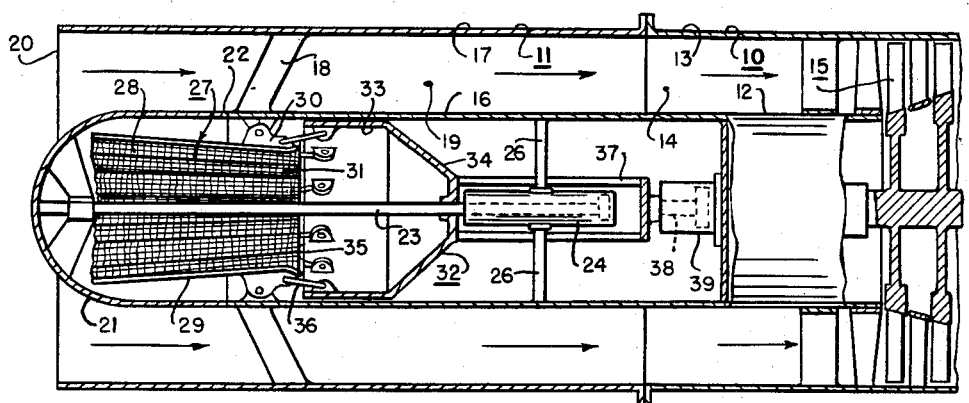
Fig. 1 is an axial sectional view of the forward end portion of an aviation turbojet engine having the invention incorporated therein, the screen structure being shown in the retracted or "stand-by" position.

Referring to the drawing in detail, there is shown the forward portion of an aviation turbojet engine 10 equipped with air intake structure 11 embodying the invention. The engine forms no part of the invention. Hence it has not been fully shown. However, as well known in the art, the engine includes the usual components including tubular inner and outer shell structure 12 and 13, respectively, defining an annular air passageway 14 for delivering air to an air compressor 15 of the axial flow type. The thus pressurized air is subsequently employed to support combustion of fuel in suitable combustion structure (not shown), thereby generating hot motive gases which are ejected in rearward direction to impart a propulsive thrust to the engine, after partial expansion in a turbine (not shown) which drives the compressor 15.

In accordance with the invention, the air intake structure 11 comprises tubular inner and outer shell structure 16 and 17, respectively, of preferably circular shape, supported in coaxially spaced relation with each other by a plurality of radial struts 18 and jointly defining an annular air passageway 19 communicating with an annular air intake opening 20. The air intake structure 11 is coaxially supported by the engine 10 in any suitable manner, thereby placing the air passageways 19 and 14 in communication with each other.

The inner shell structure 16 is further provided with a faired closure or nose member 21 for directing incoming air (as indicated by the arrows in Fig. 1) smoothly and with a minimum of turbulence into the air passageway 19 and thence through the passageway 14 to the compressor 15.

The inner shell structure 16 has a forwardly directed (relative to the direction of flight of the engine 10) open end, as indicated at 22 and the closure member 21 is carried by the actuator rod 23 of a suitable reciprocable power actuator 24 for fore and aft translation, out of and into closing relation, respectively, with the open end 22. The power actuator 24 is supported in a central position within the inner shell structure by a plurality of struts 26.

An annular screen member 27 of unitary construction is formed of any suitable readily deformable or flexible foraminous material 28, such as woven wire mesh. Since the foraminous material is incapable of self-support, it is preferably supported by an annular array of elongated ribs 29 (see Fig. 4), and the resulting structure is pivotally supported in a central position by a plurality of hinge members 30 attached to the ribs 29 and the inner shell 16.

The rear or inner periphery of the screen member 27 (when viewed as in Fig. 3), defines a rearwardly disposed central opening 31 of substantially smaller diameter than the inner shell structure 16 and rearwardly of the opening 31 there is provided a cup-shaped receptacle 32. The receptacle 32 is defined by cylindrical and frusto-conical wall portions 33 and 34, respectively, and has a forwardly directed opening 35 disposed in registry with and of larger diameter than the central opening 31 in the screen member. The receptacle 32, hereafter termed a debris trap, is pivotally connected to the rearward portions of the hinge members 30 by an annular array of links 36 and is supported at its rearward end by an open framework or cage 37 which, in turn, is attached to the actuator rod 38 of a suitable reciprocable power actuator 39.

Fig. 1 illustrates the air intake structure 11 with the screen member 27 in the retracted position and disposed within the confines of the inner shell structure 16 and the closure member 21. Thus the air intake opening 20 and the air passageways 19 and 14 are completely open to incoming air. This position is preferably assumed when the aircraft (not shown) powered by the engine 10 is in flight at sufficient elevation to substantially eliminate the possibility of induction into the engine of harmful solid particles, such as rocks, sand, loose nuts and bolts or other debris.

However, during engine warm-up and/or takeoff from a runway, as well as approaching and/or landing on the runway, the likelihood of entraining loose debris from the runway into the air stream and subsequent induction into the engine is so great that it is essential to intercept such debris before it can harm the engine.

Figure 3:
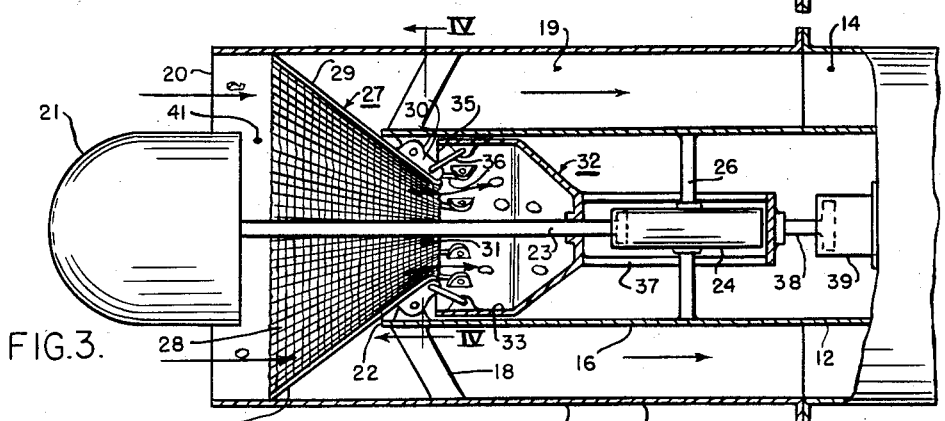
Fig. 3 is a view similar to Fig. 2 but with the screen in the extended position.
Figure 4:
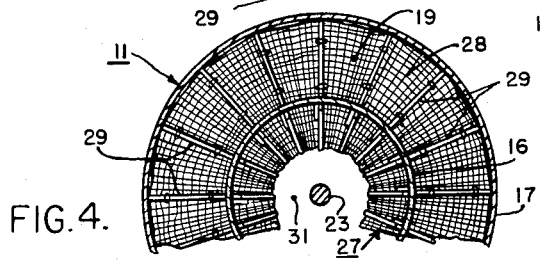
Fig. 4 is a transverse sectional view taken on line IV—IV of Fig. 3.

Figs. 3 and 4 illustrate the air intake structure 11 with the unitary screen member 27 in the extended position, wherein it extends continuously around and across the air intake opening 20 without interruption and effectively intercepts debris entrained in the incoming air. In the extended position, the screen member is of substantially frusto-conical shape and convergent in downstream direction relative to air flow. Hence, any debris intercepted thereby is quickly funneled by its own momentum in radially inward direction and ejected through the screen opening 31 into the debris trap 32, wherein it is positively retained until removal therefrom during routine engine inspeciton or servicing procedure.

Operation

Figure 2:
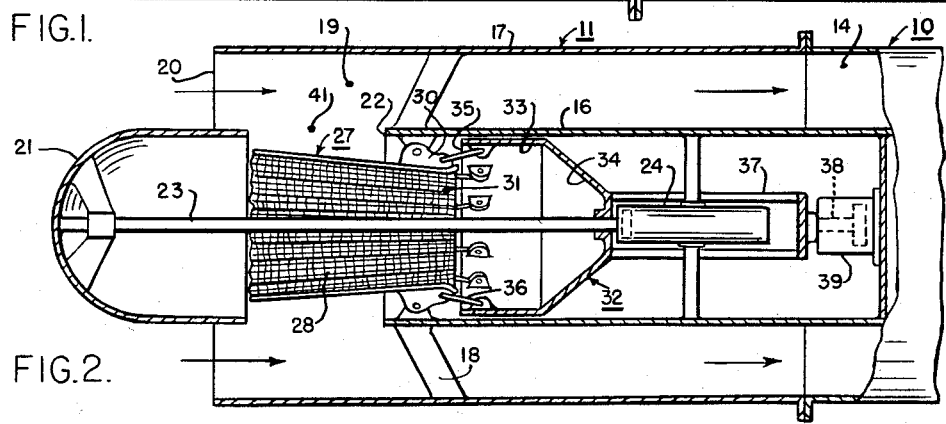
Fig. 2 is a view similar to Fig. 1 but with the structure in an intermediate position.

When it is desired to condition the air intake structure for removal of debris from the incoming air stream, the power actuator 24 is first energized by any suitable means (not shown) in a direction to extend its actuator rod 23, thereby axially translating the closure member 21 forwardly or to the left. At the end of its forward travel, the rearward edge of the closure member 21 and the forward edge of the inner shell structure jointly define an annular opening 41 permitting egress of the screen member. This intermediate position is best shown in Fig. 2.

The power actuator 39 is then energized by any suitable means (not shown) in a direction to extend its actuator rod 38 and translate the cage 37 in forward direction. Referring to Fig. 3, it will be seen that, as the cage 37 is translated in forward direction, the debris trap and links 37 are also urged forwardly, rotating the ribs 29 of the screen member in radially outwardly direction about the hinge members 30 from their parallel positions to their mutually divergent positions. The ribs 29 are thus projected through the opening 41 into abutment with the inner periphery of the outer shell structure and extend the screen across the air intake opening. In this position, the screen member assumes a frusto-conical or funnel shape with its rearward opening 31 of considerably less diameter than its forward opening.

With the screen member in the position shown in Fig. 3, debris is intercepted thereby and funneled inwardly, passing through the rearward opening into the debris trap 32. Accordingly, clogging of the screen material 28 is obviated even after a severe encounter with debris and air pressure drop across the screen may be consistently maintained within reasonable limits.

Such pressure drop inherently reduces the operating efficiency of the engine 10. Accordingly, during flight at reasonably debris-clear altitudes the air intake structure is positioned as shown in Fig. 1. To revert to this position from the position shown in Fig. 3 the sequence of operations outlined above is merely reversed. That is, the actuator 39 is first retracted, thereby retracting the screen member 27 and deforming the latter to the substantially cylindrical shape shown in Fig. 2. Then the power actuator 24 is retracted, thereby rearwardly translating the closure member 21 into abutment with the inner shell structure 16.

It will now be seen that the invention provides a highly improved air intake structure for an aircraft engine, which structure comprises a unitary or one-piece screen member completely retractable from the air stream, yet extending continuously around and across the annular air passage without interruption.

It will further be seen that the retractable screen is formed and arranged in a manner to obviate clogging thereof even after a severe encounter with debris.

With the screen in the retracted position, the air intake structure presents smooth surface contours to the air stream flowing therethrough, thereby permitting performance of the structure at optimum efficiency.

While the invention has been shown in but one form, it will be obvious to those skilled in the art that it is not so limited, but is susceptible of various changes and modifications without departing from the spirit thereof.

What is claimed is:

1. In an aircraft engine having tubular outer and inner shell structure defining an annular air intake opening, an annular foraminous member, means for movably supporting said foraminous member on said inner shell structure, said foraminous member being extensible in radially outwardly direction to a first position across said intake opening and retractable in radially inwardly direction to a second position within said inner shell structure, said foraminous member assuming a substantially frusto-conical shape convergent in downstream direction relative to air flow through said intake opening, whereby debris intercepted thereby is funneled toward said inner shell structure, and actuator means for moving said foraminous member to said first and said second position.

2. In an aircraft engine having having tubular outer and inner shell structure defining an annular air intake opening, an annular foraminous member having a peripheral edge portion defining a central opening, said inner shell structure having a central opening, means for pivotally supporting said foraminous member in a central position adjacent the opening in said inner shell structure, the opening in said inner shell structure being in registry with the opening in said foraminous member, said foraminous member being extensible in radially outwardly direction through the opening in said inner shell structure to a first position across said intake opening and retractable in radially inwardly direction through the opening in said inner shell structure to a second position within the periphery of said inner shell structure, and actuator means for moving said foraminous member to said first and said second position.

3. In an aircraft engine having tubular outer and inner shell structure defining an annular air intake opening, an annular screen member deformable from cylindrical shape to frusto-conical shape, means provided on said inner shell structure for movably supporting said screen member, said screen member being extensible in radially outwardly direction to a first position across said intake opening and retractable in radially inwardly direction to a second position within said inner shell structure, and actuator means for moving said screen member to said first and said second position, said screen member assuming said frusto-conical shape in said first position and said cylindrical shape in said second position.

4. In an aircraft engine having tubular outer and inner shell structure disposed in coaxial alignment and defining an annular air intake opening, said inner shell structure having a forwardly directed open end, an annular deformable screen member, means for pivotally supporting said screen member in a central position adjacent the open end of said inner shell structure, said screen member being divergible in radially outwardly direction through said open end of said inner shell structure to a first position across said intake opening and convergible in radially inwardly direction through said open end to a second position within said inner shell structure, actuator means for moving said screen member to said first and said second position, and movably supported fairing member for closing the open end of said inner shell structure when said screen member is disposed in said second position.

5. In an aircraft engine having tubular outer and inner shell structure defining an annular air intake opening, an annular foraminous member having a peripheral marginal portion defining a central opening, means for pivotally connecting said foraminous member to said inner shell structure, a wall structure defining a debris receptacle having an entrance opening in registry with the central opening in said foraminous member, said foraminous member being extensible in radially outwardly direction to a first position across said intake opening and retractable in radially inwardly direction to a second position within said inner shell structure, and actuator means for moving said foraminous member to said first and said second position.

6. In an aircraft engine having tubular outer and inner shell structure defining an annular air intake opening, an annular screen member having a rear peripheral portion defining a central opening and deformable from a substantially cylindrical shape to frusto-conical shape, means for pivotally supporting said screen member on said inner shell structure, wall structure defining a debris receptacle having an entrance opening in registry with the central opening in said foraminous member, said screen member being extensible in radially outwardly direction to a first position across said intake opening and retractable in radially inwardly direction to a second position within said inner shell structure, first actuator means for moving said screen member to said first and said second position, a movably supported fairing member disposed forwardly of and in coaxial alignment with said inner shell structure, and second actuator means for moving said fairing member into and out of abutment with said inner shell structure, said screen member assuming said frusto-conical shape in said first position and said cylindrical shape in said second position.

7. In an aircraft engine having tubular outer and inner shell structure defining an annular air intake opening, a unitary annular foraminous member having a central opening, means provided on said inner shell structure for pivotally supporting said foraminous member, a translatable wall structure defining a debris receptacle having an entrance opening in registry with the central opening in said foraminous member, said debris receptacle being disposed within said inner shell structure, said foraminous member being extensible in radially outwardly direction to a first position across said intake opening and retractable in radially inwardly direction to a second position within said inner shell structure, means operatively connecting said debris receptacle to said foraminous member, and actuator means for translating said debris receptacle, said debris receptacle being movable in one direction to move said foraminous member to said first position and in the opposite direction to move said foraminous member to said second position.

8. In an aircraft engine having tubular outer and inner shell structure defining an annular air intake opening, said inner shell having an open end, a faired closure member for closing said open end, a unitary annular screen member having a central opening, means for pivotally supporting said screen member adjacent the open end of said inner shell structure, a movably supported wall structure defining a debris receptacle having an entrance opening in registry with the central opening in said screen member, said screen member being extensible in radially outwardly direction through the open end of said inner shell structure to a first position across said intake opening and retractable in radially inwardly direction through said open end to a second position within said inner shell structure, means operatively connecting said debris receptacle to said screen member, first actuator means for moving said screen member to said first and said second position, and second actuator means for moving said closure member into abutment with said inner shell structure when said screen member is in said second position and out of abutment therewith to permit movement of said screen member to said first position.

No references cited.